(12) United States Patent
Fukao

(10) Patent No.: US 7,379,204 B2
(45) Date of Patent: May 27, 2008

(54) IMAGE PROCESSING APPARATUS AND METHOD, AND IMAGE PROCESSING SYSTEM

(75) Inventor: Suzuko Fukao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1067 days.

(21) Appl. No.: 10/052,360

(22) Filed: Jan. 23, 2002

(65) Prior Publication Data

US 2002/0126302 A1  Sep. 12, 2002

(30) Foreign Application Priority Data

Jan. 26, 2001  (JP)  ............................. 2001-019002

(51) Int. Cl.
*G06F 15/00* (2006.01)
(52) U.S. Cl. ................ 358/1.9; 358/2.1; 358/3.23; 358/518; 358/523; 382/167
(58) Field of Classification Search ................ 358/1.9, 358/2.1, 3.23, 518, 523; 382/167
See application file for complete search history.

(56) References Cited

U.S. PATENT DOCUMENTS

| | | | | |
|---|---|---|---|---|
| 5,231,504 A | * | 7/1993 | Magee | ........................ 358/500 |
| 5,289,295 A | * | 2/1994 | Yumiba et al. | ............. 358/518 |
| 5,384,601 A | * | 1/1995 | Yamashita et al. | ........... 348/577 |
| 5,937,089 A | * | 8/1999 | Kobayashi | ................... 382/167 |
| 6,097,837 A | * | 8/2000 | Cok | ........................... 382/167 |
| 6,108,441 A | * | 8/2000 | Hiratsuka et al. | ........... 382/167 |
| 6,172,681 B1 | * | 1/2001 | Ueda | ........................... 345/589 |
| 6,262,817 B1 | * | 7/2001 | Sato et al. | ................... 358/518 |
| 6,307,393 B1 | * | 10/2001 | Shimura | ..................... 324/765 |
| 6,621,594 B1 | * | 9/2003 | Kuwata et al. | .............. 358/3.1 |
| 6,683,616 B1 | * | 1/2004 | Yamauchi et al. | .......... 345/589 |
| 6,753,978 B1 | * | 6/2004 | Chang | ....................... 358/3.04 |

* cited by examiner

*Primary Examiner*—Kimberly Williams
*Assistant Examiner*—Michael Burleson
(74) *Attorney, Agent, or Firm*—Fitzpatrick, Cella, Harper & Scinto

(57) ABSTRACT

If only a specific color and its nearby colors of image data are adjusted, density discontinuation occurs in the image as a whole. If masking is performed to avoid this problem, the adjustment range cannot be bounded, so the processing time increases. On an adjustment parameter designating unit, a user designates, as parameters, a reference color, the adjusted value of the reference color, and an adjustment region in a color space. A coordinate transformer transforms the coordinates of image data as an element of a color correction table, on the basis of a transformation matrix for transformation to an object color space. This transformation matrix is formed on the basis of the parameters by a transformation matrix calculator. If a region determinator determines that the image data is in the adjustment region, an adjusted value calculator calculates an adjusted value on the basis of the parameters.

15 Claims, 11 Drawing Sheets

FIG. 2

| RGB VALUES BEFORE ADJUSTMENT | RGB VALUES AFTER ADJUSTMENT |
|---|---|
| (0, 0, 0) | (0, 0, 0) |
| (0, 0, 17) | (0, 1, 12) |
| (0, 0, 34) | (0, 4, 30) |
| . | . |
| . | . |
| (0, 0, 255) | (2, 10, 253) |
| (0, 17, 0) | (2, 15, 0) |
| (0, 17, 17) | (3, 17, 15) |
| . | . |
| . | . |
| (0, 17, 255) | (0, 15, 255) |
| (0, 34, 0) | (0, 30, 8) |
| . | . |
| . | . |
| (255, 255, 255) | (255, 255, 255) |

IMAGE PROCESSING APPARATUS AND METHOD, AND IMAGE PROCESSING SYSTEM

FIELD OF THE INVENTION

The present invention relates to an image processing apparatus and method, e.g., an image processing apparatus and method which perform color adjustment for an image, and an image processing system.

BACKGROUND OF THE INVENTION

When an image displayed on a monitor of a computer system or the like is to be printed out from a printer, a so-called color matching process is generally required which performs adjustment so that the appearance of printed colors substantially equals the appearance of monitor display colors, since the color reproduction region of a monitor largely differs from that of a printer. A known example of this color matching process is a method of looking up a color correction table which is formed by taking account of the color characteristics of a monitor and a printer.

After this color matching process is executed, the user sometimes determines, on the basis of the image printed by a printer, that a specific color and its nearby colors further require fine adjustment. This fine adjustment is performed by changing the values of the above-mentioned color correction table for color matching, or by changing the values of individual pixels of the image data.

If, however, only a specific color is changed in a pinpoint manner in order to perform fine adjustment as in the above conventional method, density discontinuation occurs particularly in gradation images.

To prevent this problem, there is an adjustment method where a masking coefficient is calculated in such a way that a specific color becomes a desired color, and colors distant from the specific color change only slightly. Using the calculated coefficient, a masking process is performed for all values in the color correction table (or for all pixel values in image data). This method does not cause any density discontinuation as described above. With this method, however, it is difficult to limit the range over which the adjustment has its effect. The method also requires a long processing time.

SUMMARY OF THE INVENTION

The present invention has been proposed to solve the conventional problems, and has as its object to provide an image processing apparatus and method capable of adjusting a desired color of an image by suppressing the occurrence of discontinuation in the boundary of a color adjustment region, while restricting this color adjustment region, and to provide an image processing system.

It is another object of the present invention to provide an image processing apparatus and method by which the user can easily predict adjustment results and readily designate desired color adjustment, and to provide an image processing system.

As a means for achieving the above objects, an image processing apparatus of the present invention has the following arrangement.

That is, an image processing apparatus for performing color adjustment for image data is characterized by comprising designating means for designating, as parameters, a reference color, an adjusted color of the reference color, and an adjustment region in a color space, region determining means for determining whether input image data is in the adjustment region, and adjusted value calculating means for calculating an adjusted value of the image data on the basis of the parameters, if the region determining means determines that the image data is in the adjustment region.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view showing an example of data held in a color correction table;

DETAILED DESCRIPTION OF THE PREFERRED EMBODIMENTS

Preferred embodiments of the present invention will now be described in detail in accordance with the accompanying drawings.

First Embodiment

Figure 1:
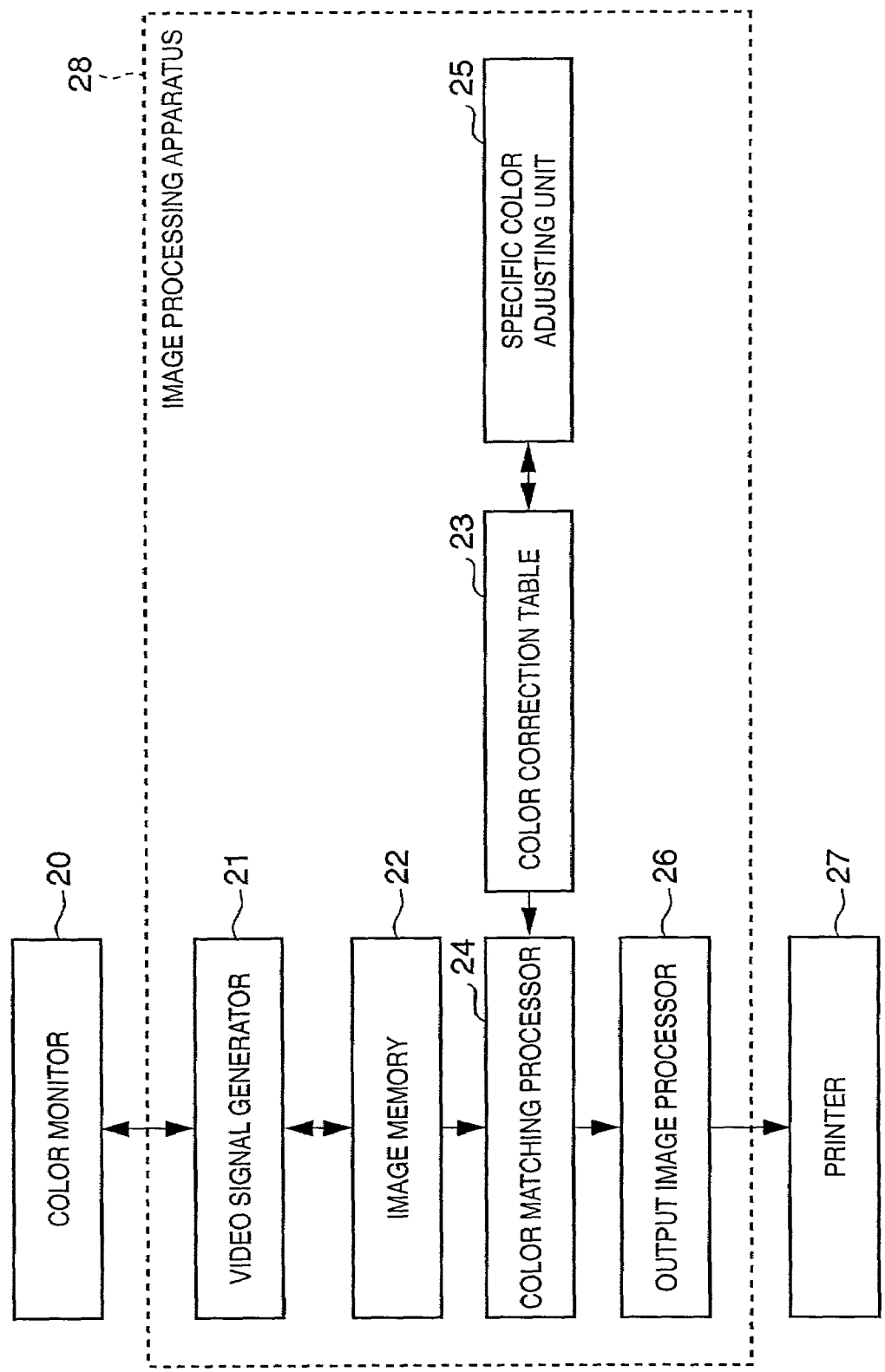
FIG. 1 is a block diagram showing the arrangement of an image processing apparatus according to an embodiment of the present invention.

FIG. 1 is a block diagram showing the arrangement of an image processing apparatus according to this embodiment. Referring to FIG. 1, a color monitor 20 for displaying images and a printer 27 for printing images on a printing medium are connected to an image processing apparatus 28.

Components of this image processing apparatus 28 are a video signal generator 21 for converting image data into a video signal, an image memory 22 for storing image data, a color correction table 23 which stores the correspondence between monitor display colors and printed colors, a color matching processor 24 for matching monitor display colors with printed colors by looking up the color correction table 23, a specific color adjusting unit 25 for finely adjusting an arbitrary color in the color correction table 23, and an output image processor 26 for converting image data into a printer driving signal.

In this embodiment, image data to be processed is digital data obtained by an image input device such as a digital camera or scanner, or data generated as computer graphics (CG). This image data is prestored as pixel values corresponding to the brightness into the image memory 22. More specifically, each pixel value has 8 bits for each of red (R), green (G), and blue (B).

In this embodiment, the color monitor 20 is a display device such as a CRT or LCD. The printer 27 is an inkjet printer which discharges and fixes ink droplets of cyan (C), magenta (M), yellow (Y), and black (K) onto a printing medium, and expresses a shade of color by the density. Note that the color monitor 20 and the printer 27 are not limited to these forms. For example, the printer 27 can also be an electrophotographic printer or a heat transfer printer.

FIG. 2 is a view showing details of the color correction table 23. As shown in FIG. 2, when each of RGB values of input pixel values is 0, 17, 34, 51, 68, 85, 102, 119, 136, 153, 170, 187, 204, 221, 238, and 255, this color correction table 23 holds the corresponding RGB values obtained by taking account of the output characteristics of the printer 27.

In the image processing apparatus 28 shown in FIG. 1, image data stored in the image memory 22 is supplied to the color matching processor 24. This color matching processor 24 performs color matching for an image to be displayed on the color monitor 20 via the video signal generator 21, and for an image to be printed out from the printer 27 via the output image processor 26. More specifically, the color matching processor 24 calculates output values corresponding to individual pixel values of image data by interpolation by looking up the color correction table 23. After that, the output image processor 26 controls the discharge of the inks C, M, Y, and K for each of the input RGB values. The printer 27 thus reproduces desired colors on a printing medium.

The characteristic feature of this embodiment is that if a user determines that it is desirable to add more changes to a certain color of an output image printed as described above, the specific color adjusting unit 25 adjusts the color correction table 23 to achieve the color matching process desired by the user.

The operation in this specific color adjusting unit 25 will be described in detail below.

Figure 3:
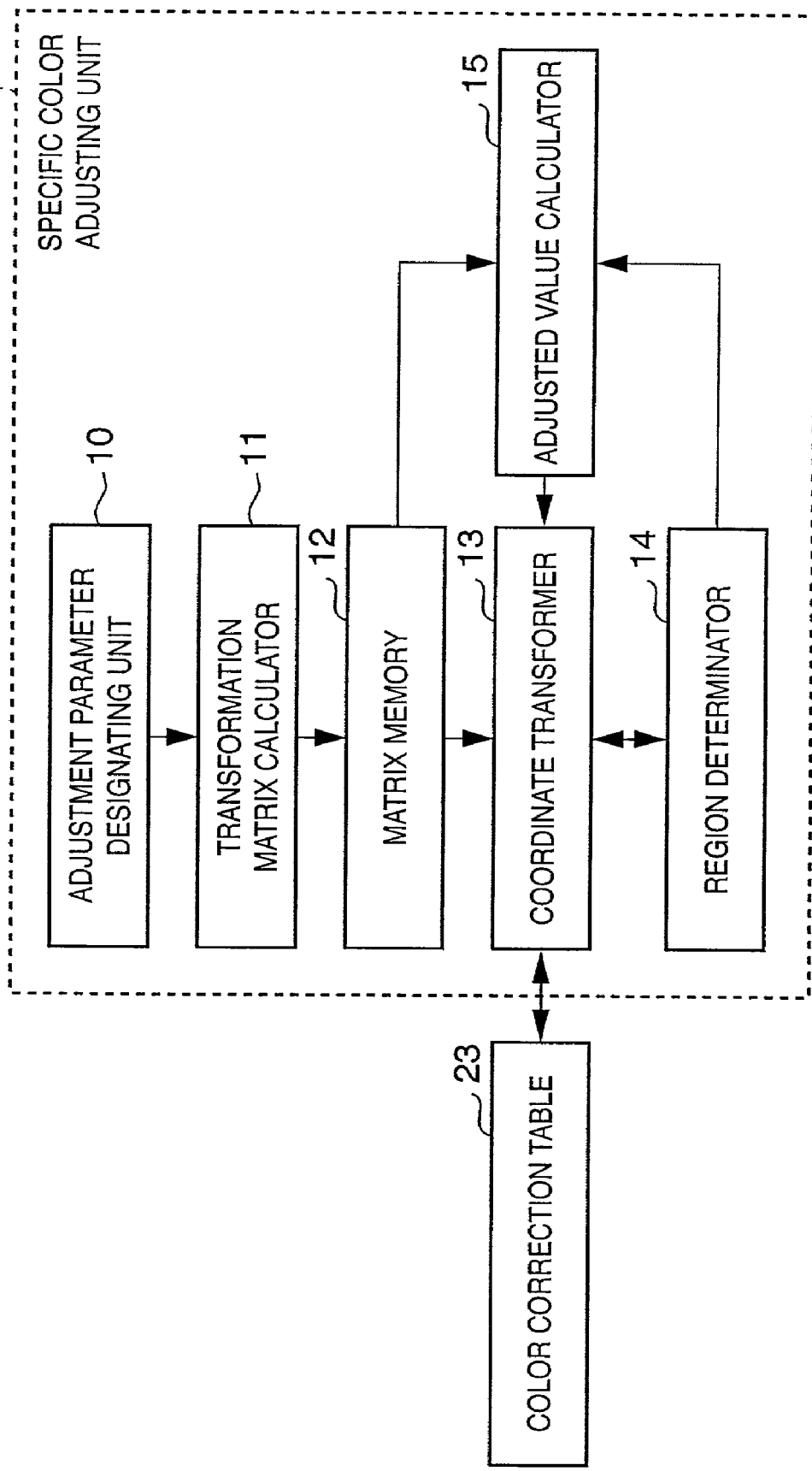
FIG. 3 is a block diagram showing the arrangement of a specific color adjusting unit.

FIG. 3 is a block diagram showing details of the arrangement of the specific color adjusting unit 25. Referring to FIG. 3, an adjustment parameter designating unit 10 allows a user to designate, as adjustment parameters, RGB values as the reference of adjustment (a reference color to be adjusted), RGB values after adjustment (an adjusted reference color), and a region in which specific color adjustment has its effect. A transformation matrix calculator 11 calculates an affine transformation matrix (to be described later) on the basis of the adjustment parameters designated by the adjustment parameter designating unit 10. A matrix memory 12 stores this matrix calculated by the transformation matrix calculator 11. A coordinate transformer 13 transforms the coordinates of a color to be adjusted into those of an adjusted color. A region determinator 14 determines whether a color to be adjusted is within the adjustment region designated by the user. An adjusted value calculator 15 calculates the adjusted color of a color to be adjusted.

Figure 4:
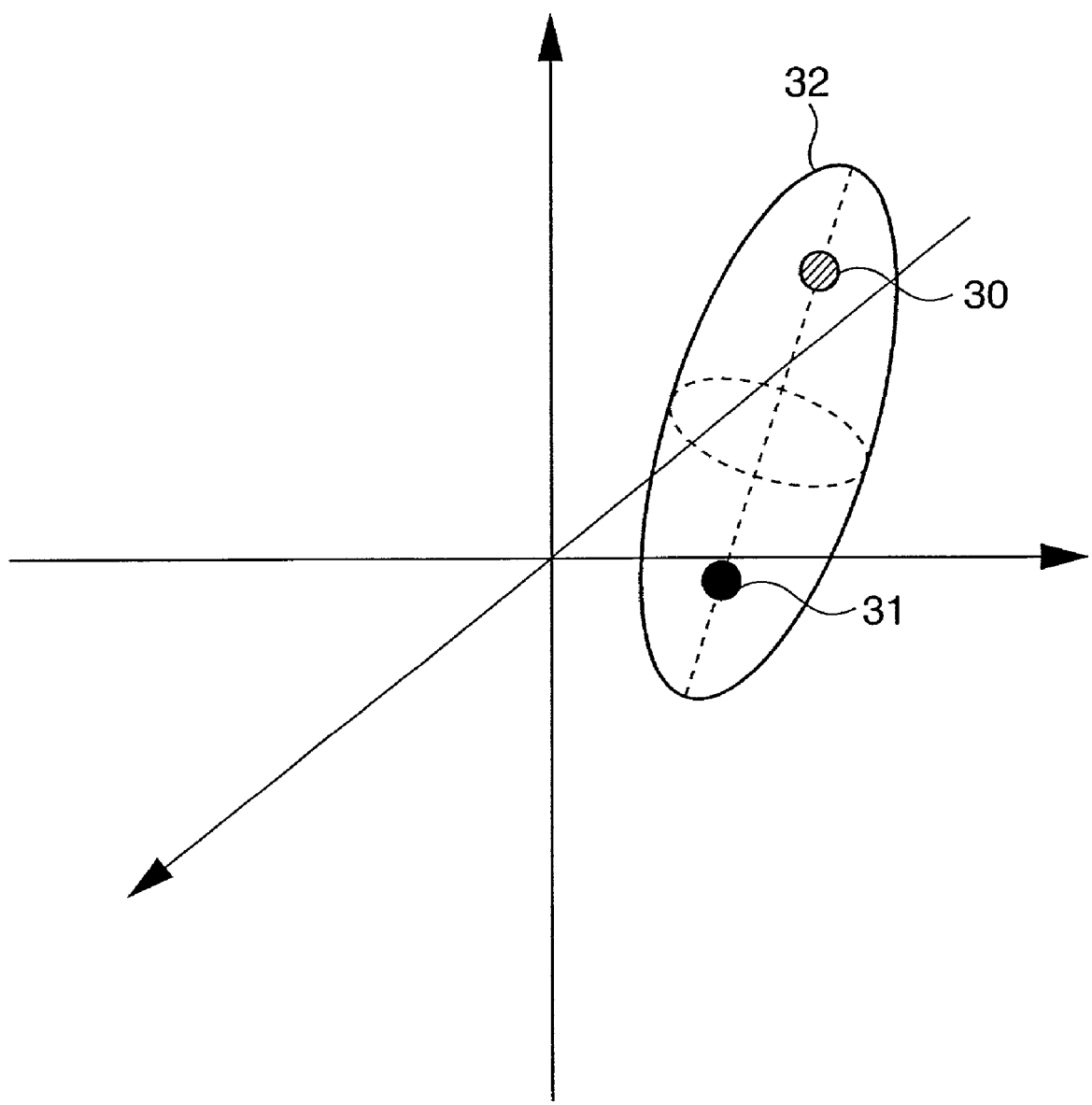
FIG. 4 is a graph for explaining adjustment parameters in an RGB space.

FIG. 4 is a view showing a reference color to be adjusted, an adjusted reference color, and a color adjustment range designated in an RGB color space by the user by using the adjustment parameter designating unit 10. Referring to FIG. 4, reference numeral 30 denotes a reference color to be adjusted designated by the adjustment parameter designating unit 10; 31, an adjusted reference color, i.e., adjusted RGB values of the reference color 30 to be adjusted; and 32, an ellipsoid having the reference color 30 to be adjusted and the adjusted reference color 31 on the major axis. This ellipsoid 32 indicates a color adjustment range in this embodiment. That is, the specific color adjusting unit 25 adjusts colors within the ellipsoid 32 in accordance with the adjustment amount of the reference color 30 to be adjusted, and does not adjust colors outside of the ellipsoid 32.

Figure 5:
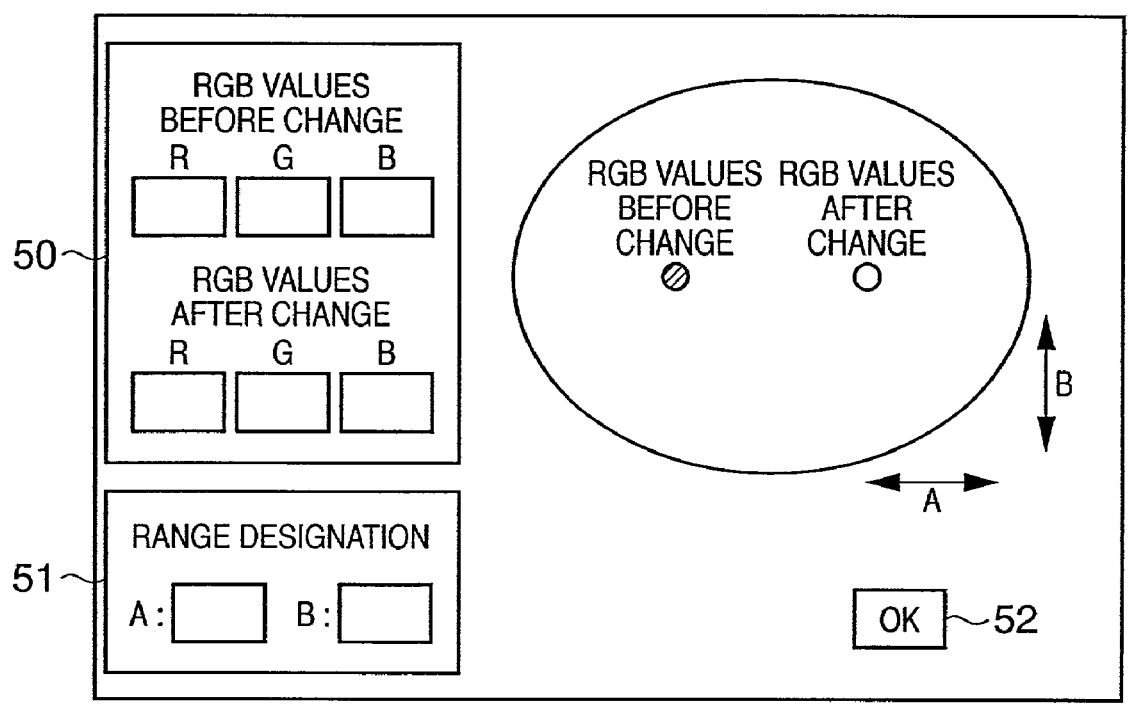
FIG. 5 is a view showing a UI for designating adjustment parameters.

FIG. 5 shows an example of the user interface (UI) of the adjustment parameter designating unit 10. Referring to FIG. 5, an adjustment reference setting portion 50 sets the reference color 30 to be adjusted and the adjusted reference color 31 as RGB values before and after the change, respectively. A region setting portion 51 sets the size of the ellipsoid 32 representing the adjustment region boundary by using the dimensions of the major and minor axes. An OK setting portion 52 is used when the setting is completed. With this UI, the reference color to be adjusted, adjusted reference color, and adjustment region (ellipsoid) are input.

Figure 6:
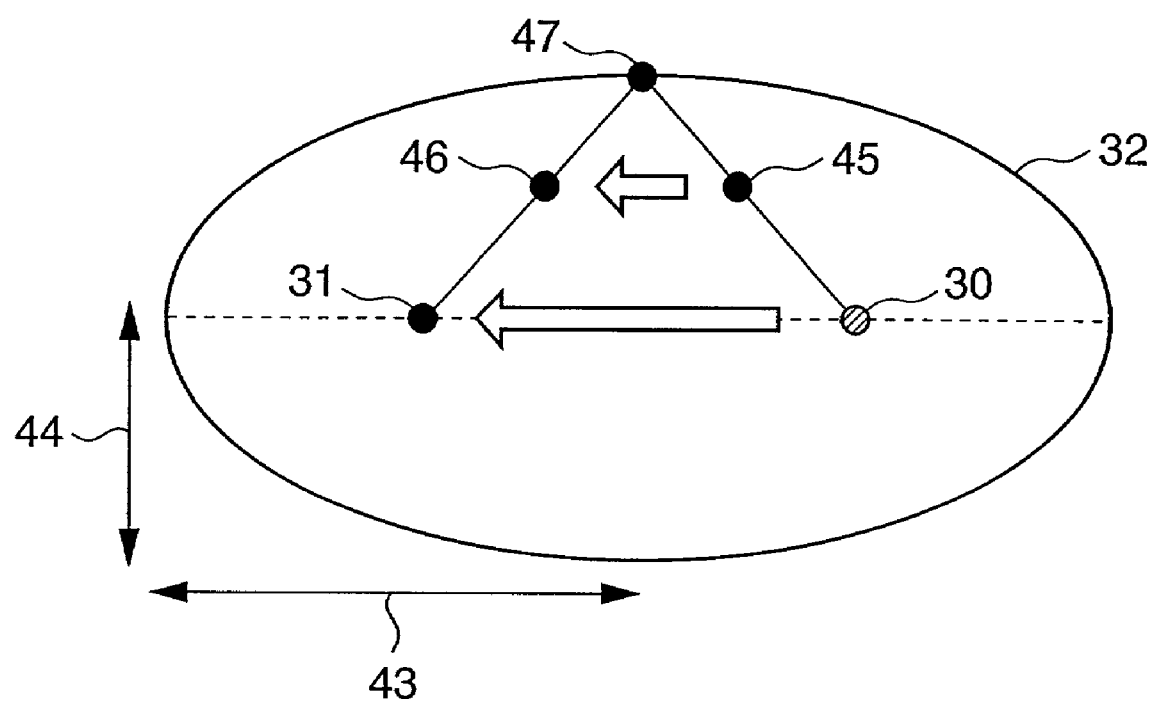
FIG. 6 is a schematic view showing an outline of calculations in an adjusted value calculator.

FIG. 6 is a two-dimensional schematic view showing an outline of the calculations in the adjusted value calculator 15. Referring to FIG. 6, reference numerals 30, 31, and 32 denote the reference color to be adjusted, adjusted reference color, and ellipsoid indicating the color adjustment range, respectively, which are shown in FIG. 4 and set by the UI shown in FIG. 5. Reference numerals 43 and 44 denote the major axis length and minor axis length, respectively, of the designated ellipsoid 32; 45, an arbitrary color to be adjusted present inside the ellipsoid 32; 46, an adjusted color of the color 45 to be adjusted; and 47, an intersection of the ellipsoid 32 and a straight line which passes through the reference color 30 to be adjusted and the adjusted reference color 31. When the arbitrary reference color 45 to be adjusted is given, the adjusted color 46 is set in a position which is a point on a line connecting the intersection 47 and the adjusted reference color 31, and which is changed in the same direction as the movement from the color 45 to be adjusted to the reference color 30 to be adjusted.

Note that in a three-dimensional space, there are two minor axes perpendicular to the major axis 43. This embodiment assumes that these two minor axes have the same length.

The color adjusting process in the image processing apparatus 28 of this embodiment will be explained in detail below with reference to a flow chart in FIG. 7.

In step S100, the user designates on the adjustment parameter designating unit 10 a reference color 30 to be adjusted, an adjusted reference color 31, and the lengths of the major and minor axes of an ellipsoid 32 as a region in which this adjusting operation has its effect.

In step S101, an affine transformation matrix for coordinate transformation is calculated by the transformation matrix calculator 11 and stored in the matrix memory 22. The method of calculating this affine transformation matrix will be explained below.

Figure 8:
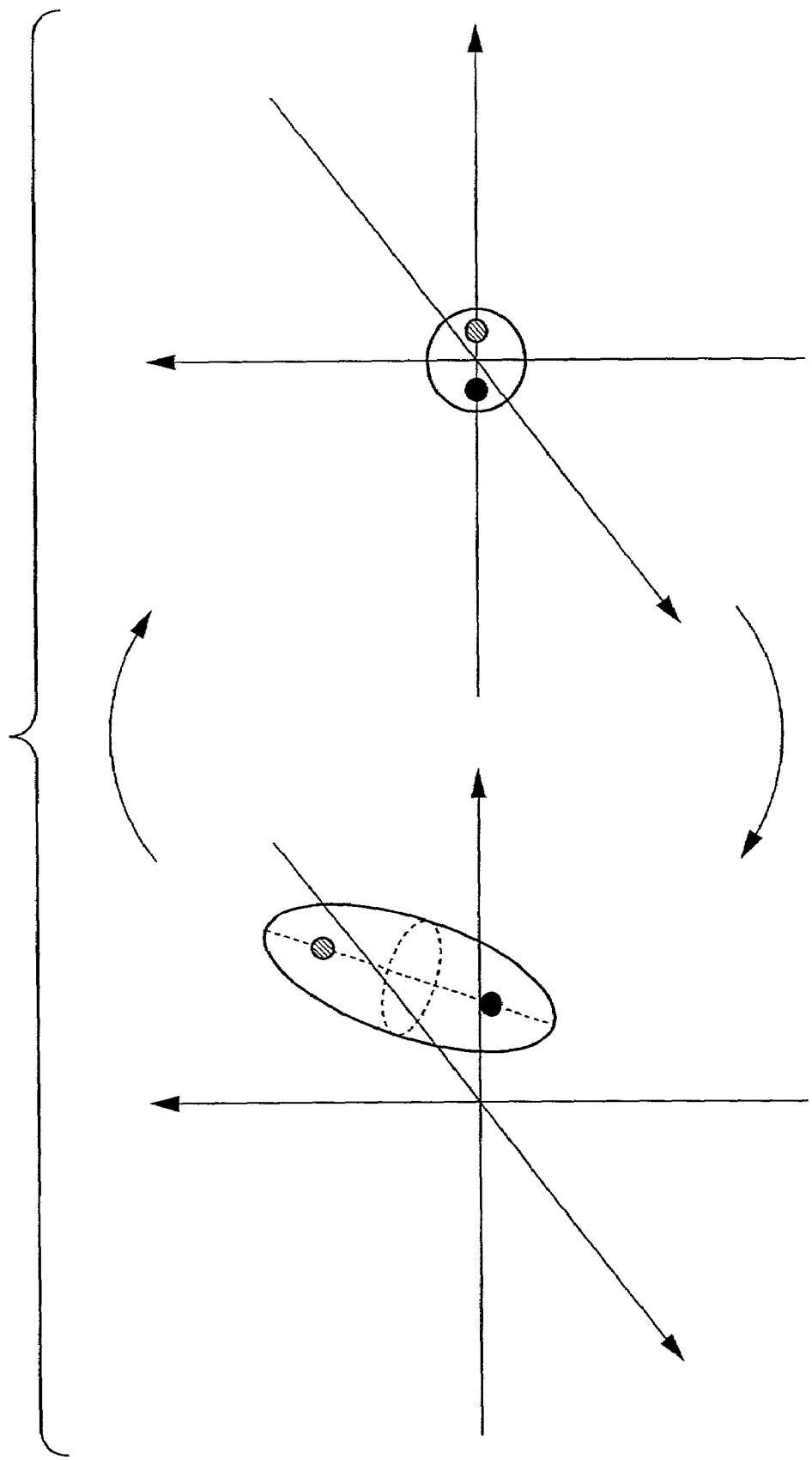
FIG. 8 is a view schematically showing the transformation of coordinates by affine transformation.

In computer graphics technologies, affine transformation to an ellipsoid which is in an arbitrary position at an arbitrary angle from a unit sphere centering around the origin and which has a given size, and inverse transformation of this affine transformation, are often defined. FIG. 8 schematically shows the way affine transformation is performed for an ellipsoid and a unit sphere centering around the origin. Referring to FIG. 8, the unit sphere on the right-hand side is affine-transformed into the ellipsoid on the left-hand side and further inversely transformed into the unit sphere. Also, the reference color to be adjusted and the adjusted reference color are affine-transformed inside the unit sphere and the ellipsoid. The coordinate system on the right-hand side of FIG. 8 in which the unit sphere is defined is called an object coordinate system. Letting $(R_{ref}, G_{ref}, B_{ref})$ and $(R_{ref}', G_{ref}', B_{ref}')$ denote the RGB values of the reference color to be adjusted and the adjusted reference color, respectively, the relationship between arbitrary RGB coordinates $(r_R, g_R, b_R)$ and object coordinates $(r_O, g_O, b_O)$ is represented by the following equation:

$$\begin{bmatrix} r_R \\ g_R \\ b_R \\ 1 \end{bmatrix} = M \begin{bmatrix} r_O \\ g_O \\ b_O \\ 1 \end{bmatrix}$$

$$M = \begin{bmatrix} 1 & 0 & 0 & \frac{R_{ref} + R_{ref}'}{2}, \\ 0 & 1 & 0 & \frac{G_{ref} + G_{ref}'}{2}, \\ 0 & 0 & 1 & \frac{B_{ref} + B_{ref}'}{2}, \\ 0 & 0 & 0 & 0 \end{bmatrix} \begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix}$$

$$\begin{bmatrix} \cos\alpha & -\sin\alpha & 0 & 0 \\ \sin\alpha & \cos\alpha & 0 & 0 \\ 0 & 0 & 1 & 0 \\ 0 & 0 & 0 & 1 \end{bmatrix} \begin{bmatrix} A & 0 & 0 & 0 \\ 0 & B & 0 & 0 \\ 0 & 0 & B & 0 \\ 0 & 0 & 0 & 1 \end{bmatrix}$$

where θ is the angle between the major axis of the ellipsoid and the G axis of the RGB space, α is the angle between the major axis and the B axis of the RGB space, and A and B are the lengths of the major and minor axes, respectively, of the ellipsoid.

A transformation matrix M indicated by the above equation and its inverse matrix $M^{-1}$ are saved in the matrix memory 12 and used in a coordinate transformation process to be described later.

Next, the flow advances to step S102, and the coordinate transformer 13 transforms the reference color 30 to be adjusted and the adjusted reference color 31 on the RGB coordinates into object coordinates by using the affine transformation matrix calculated as above.

In step S103, the coordinate transformer 13 loads a color P to be adjusted (equivalent to the corrected RGB values in FIG. 2) from the color correction table 23, and transforms this color P to be adjusted into object coordinates. In step S105, the region determinator 14 checks whether the color P to be adjusted transformed into the object coordinate system is a point inside the unit sphere centering around the origin, i.e., is present within the correction execution range. If the color P to be adjusted is not a point inside the unit sphere, the flow advances to step S107, and the coordinate transformer 13 inversely transforms the point P in the object coordinate system into the RGB coordinate system.

On the other hand, if the color P to be adjusted is inside the unit sphere, this means that this point is present within the correction range. Therefore, the flow advances to step S106, and the coordinate transformer 13 performs the following adjustment by using the adjusted value calculator 15.

Figure 9:
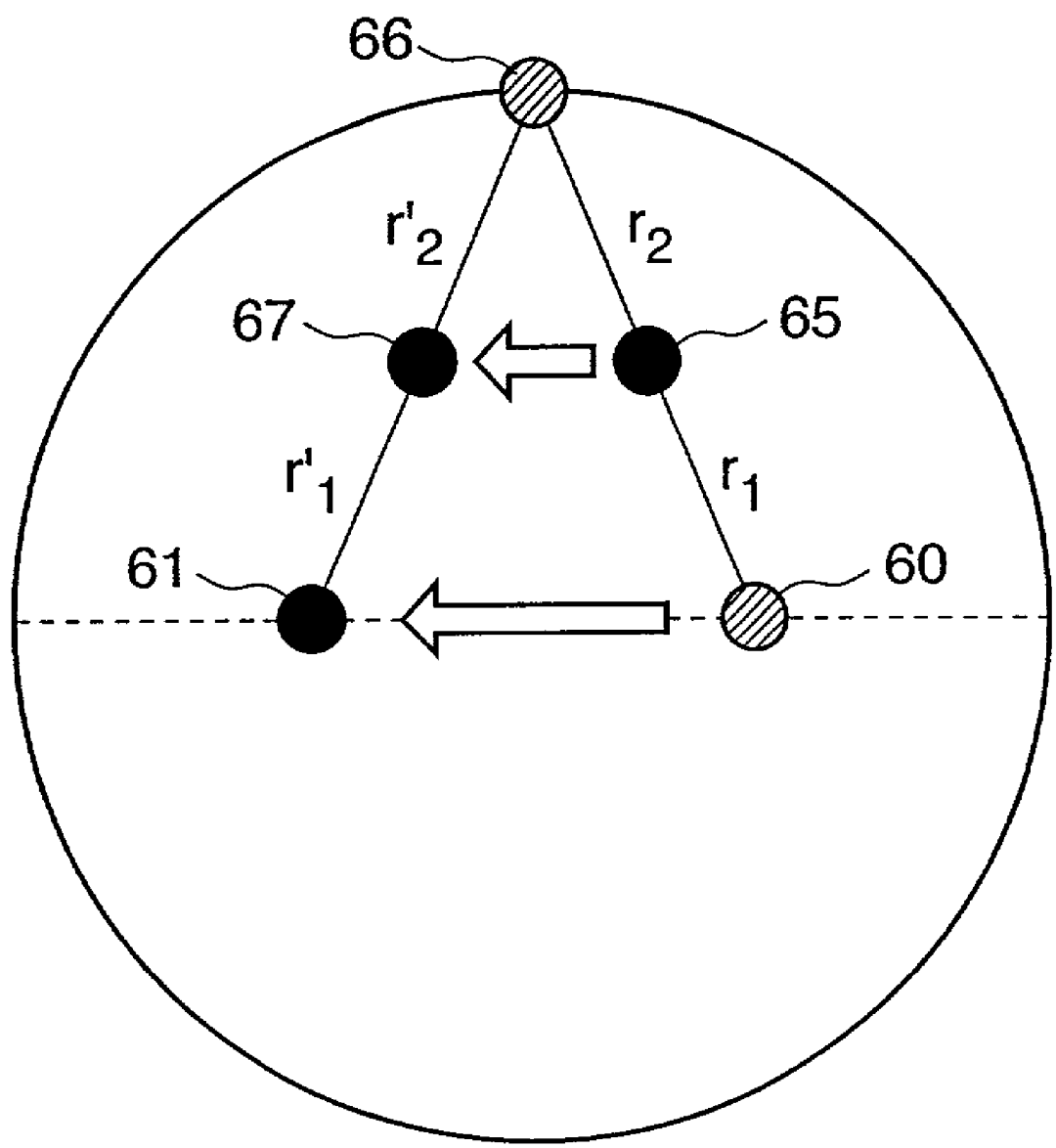
FIG. 9 is a schematic view showing an outline of an adjustment process inside a unit sphere on object coordinates.

FIG. 9 two-dimensionally illustrates an outline of this adjusting operation inside the unit sphere. Referring to FIG. 9, reference numerals 60 and 61 denote a reference color to be adjusted and an adjusted reference color, respectively, in the object coordinate system; 65, a color to be adjusted (corresponding to P in the RGB coordinate system); 66, an intersection of the unit sphere and a straight line which passes through the reference color 60 to be adjusted and the color 65 to be adjusted; and 67, the adjusted color of the color 65 to be adjusted. The adjusted value calculator 15 calculates the adjusted color 67 shown in FIG. 9 as follows.

First, the adjusted value calculator 15 calculates the intersection 66 of the unit sphere and the straight line which passes through the reference color 60 to be adjusted and the color 65 to be adjusted. The adjusted value calculator 15 then calculates a distance $r_1$ from the reference color 60 to be adjusted to the color 65 to be adjusted, and a distance $r_2$ from the color 65 to be adjusted to the intersection 66. The adjusted value calculator 15 then sets the adjusted color 67 as a point on a straight line connecting the intersection 66 and the adjusted reference color 61, such that the ratio of a distance $r'_1$ from the adjusted reference color 61 to a distance $r'_2$ from the intersection 66 equals the ratio of $r_1$ to $r_2$.

When the adjusted color 67 is thus calculated in step S106, the flow advances to step S107 to transform this color into RGB values. In step S108, the obtained RGB values are stored in a corresponding position in the color correction table 23. In step S109, whether the adjustment process is complete for all colors in the color correction table 23 is checked. If not, the processes in steps S103 to S109 are repeated. If the process is complete for all colors, the specific color adjusting process of the color correction table 23 is terminated.

In this embodiment, a reference color is changed to a designated color by the above-mentioned specific color adjusting process, and no density discontinuation occurs in the boundary of the adjustment region.

Furthermore, in this color adjusting process, the adjustment amounts of colors near the reference color are determined by geometrical calculations. Since this allows an easy intuitive understanding of overall color changes by mapping, the user can readily predict adjustment results. Accordingly, the user can easily designate desired color adjustment.

Also, the mapping process is performed in the object coordinates, so the processing such as intersection calculations can be simplified. This also speeds up the color adjustment process.

Second Embodiment

The second embodiment according to the present invention will be described below.

In the above first embodiment, coordinate transformation is performed for all colors stored in the color correction table 23. This second embodiment is characterized in that a range within which specific color adjustment has its effect is roughly calculated beforehand, and no coordinate transformation is performed for values outside this range.

Details of the color adjustment process in the second embodiment will be described below with reference to FIGS. 10A and 10B. Assume that the arrangement of an image processing apparatus according to this second embodiment is the same as the first embodiment described above, and that an affine transformation matrix for transformation between an RGB coordinate system and an object coordinate system is already calculated by the same procedure as in the first embodiment.

Figure 10B:
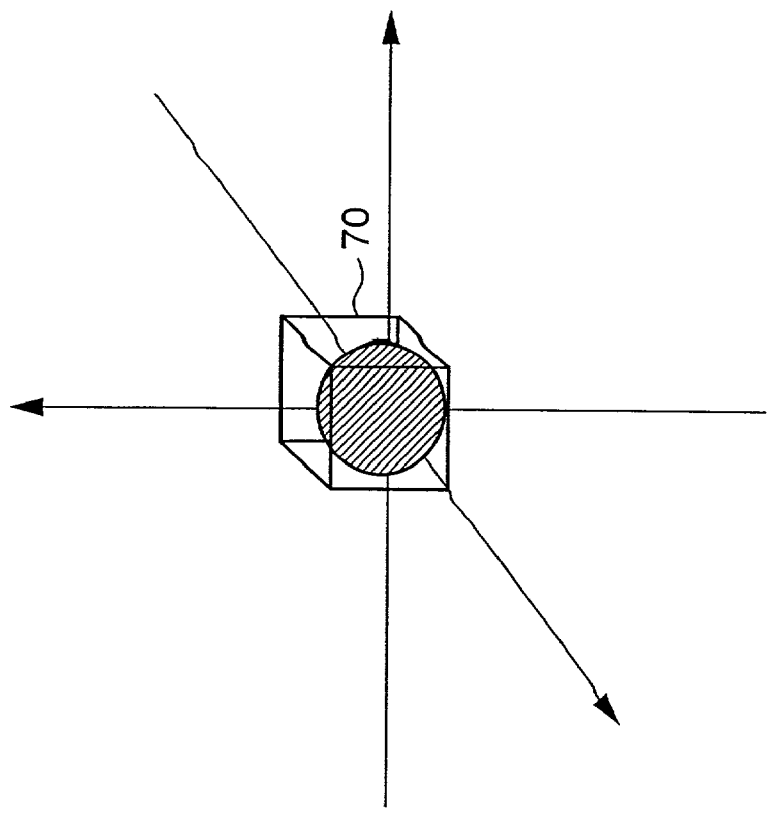
FIGS. 10A and 10B are views showing the concept of a bounding box in the second embodiment according to the present invention.
Figure 10A:
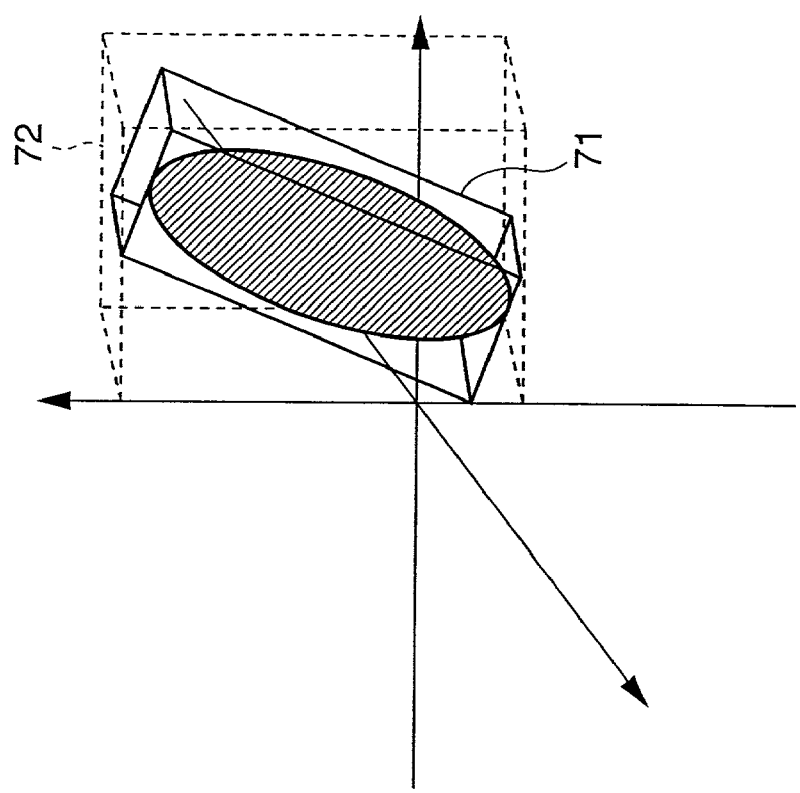

First, in an object coordinate system shown in FIG. 10A, a bounding box 70 of a unit sphere centering around the origin is calculated. As shown in FIG. 10A, a bounding box is a minimum cube containing the unit sphere and has eight vertices (1,1,1), (1,1,−1), (1,−1,1), (−1,1,1), (1,−1,−1), (−1,1,1), (−1,1,−1), and (−1,−1,−1).

Subsequently, the coordinates of these vertices of the bounding box 70 are transformed into RGB coordinates shown in FIG. 10B using the affine transformation matrix. Referring to FIG. 10B, reference numeral 71 denotes a region in which the bounding box 70 is transformed into the RGB coordinates; and 72, a region defined by eight points represented by combinations of maximum and minimum values Rmax, Rmin, Gmax, Gmin, Bmax, and Bmin of the RGB values indicating the region 71.

A specific color adjusting unit 25 of the second embodiment executes the same specific color adjusting process (steps S104 to S108 in FIG. 7) as in the first embodiment only when a color P to be adjusted loaded from a color correction table 23 is within the region 72 shown in FIG. 10B. That is, letting (r,g,b) be the RGB values of the color P to be adjusted, the specific color adjusting process is executed only when these values meet the following conditions.

Rmin≦r≦Rmax and Gmin≦g≦Gmax and Bmin≦b≦Bmax

Figure 7:
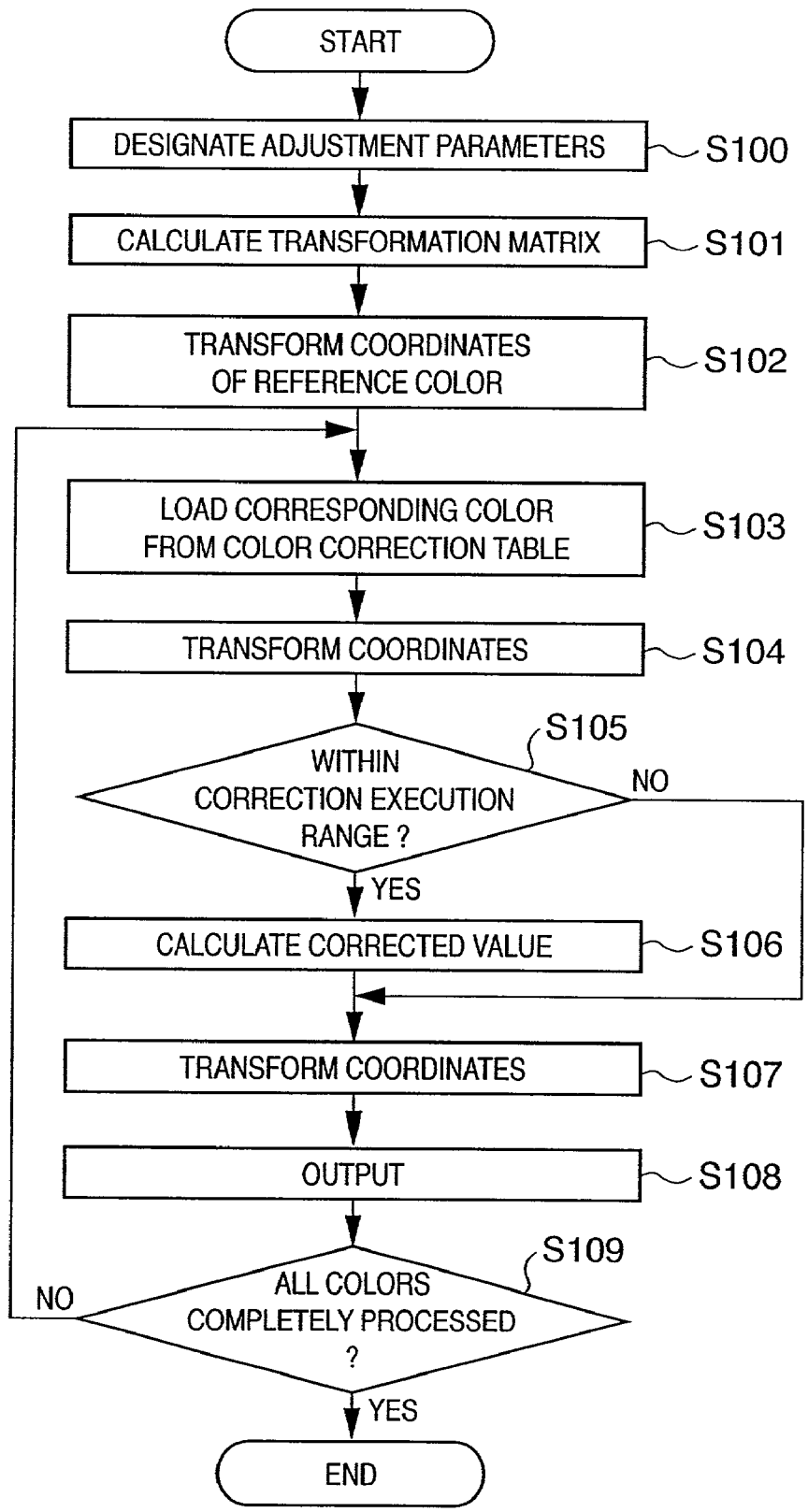
FIG. 7 is a flow chart showing a specific color adjusting process.

That is, after the color P to be adjusted is loaded from the color correction table 23 in step S103 of FIG. 7, a process of checking whether this color P is in the region 72 shown in FIG. 10B is inserted. This process can be executed by a region determinator 14, for example. If the color P to be adjusted is in the region 72, processing from step S104 is executed. If the color P is not in the region 72, the flow returns to step S103, and the next color to be adjusted is loaded from the color correction table 23.

In the second embodiment as described above, an adjustment region is roughly calculated in advance, and no coordinate transformation is performed for values outside this range. This achieves faster processing especially when the number of data to be processed is large.

Modifications

The present invention is not limited to the above first and second embodiments, and various modifications and applications are possible as described below.

Adjustment Region

In the above embodiments, the boundary of a region in which specific color adjustment has its effect is defined by an ellipsoid. However, this region can also be defined by another geometric figure, e.g., a polyhedron such as a rectangular parallelepiped or octahedron.

Method of Adjustment

In the above embodiments, the adjustment amount of a color inside the adjustment region is linearly changed with respect to the distance from a reference color of adjustment. However, this adjustment amount of a color can also be nonlinearly changed such that the amount decreases as the distance of the color from the reference color of adjustment increases.

Color Space

In the above embodiments, correction in an RGB space is explained. However, similar processing can also be performed in another color space such as an Lab space.

Object of Specific Color Adjustment

In the above embodiments, the specific color adjusting process is performed for values stored in the color correction table 23. However, this adjustment can also be performed for all pixels of a given digital image.

Figure 11:
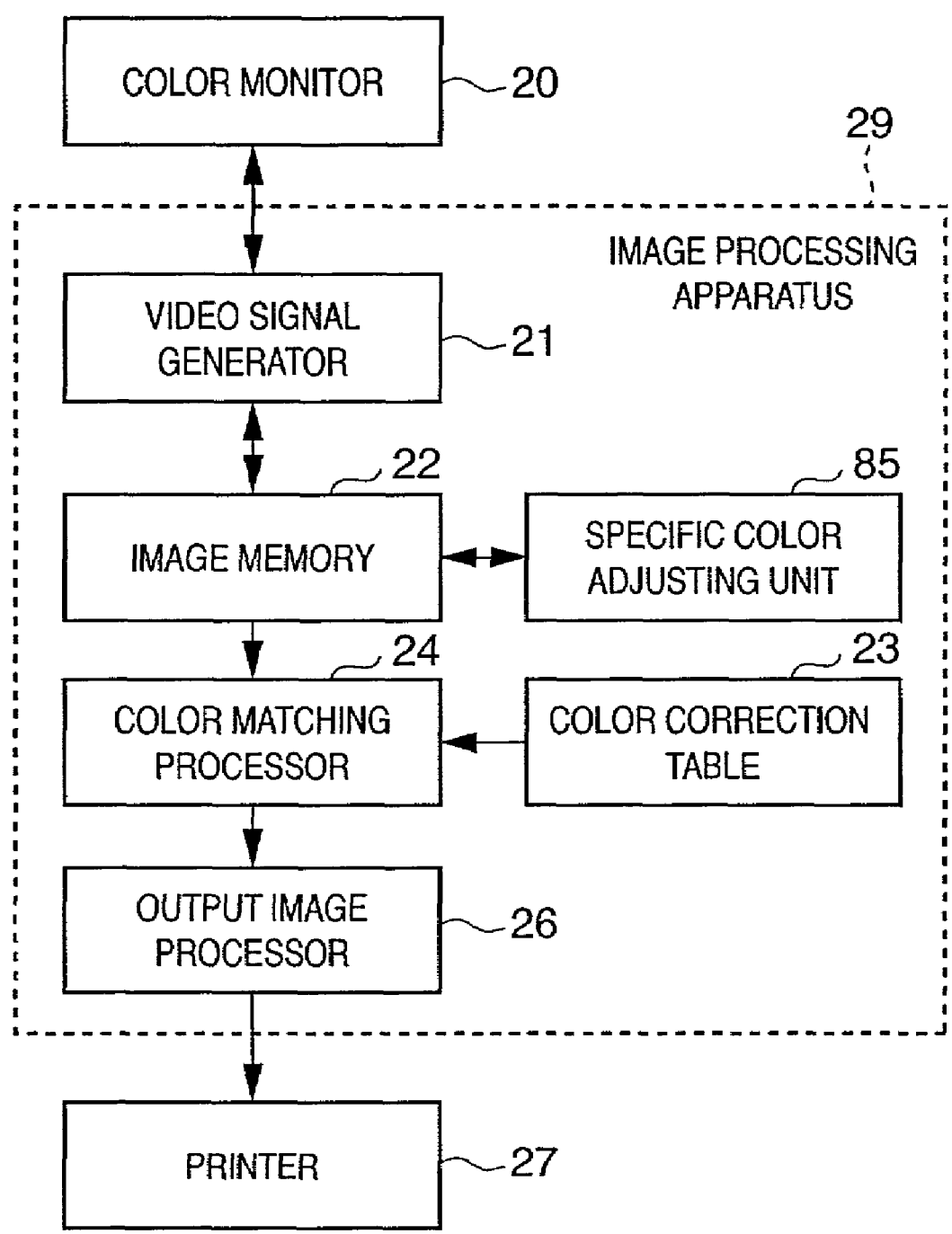
FIG. 11 is a block diagram showing the arrangement of an image processing apparatus according to a modification of the present invention.

FIG. 11 is a block diagram showing the arrangement of an image processing apparatus 29 according to this modification. A specific color adjusting unit 85 is connected to an image memory 22 and performs the correction process described in the above embodiments for each pixel value of image data stored in the image memory 22.

Accordingly, on the basis of an image displayed on a color monitor 20 or an output image printed by a printer 27, adjustment desired by the user can be performed only for a specific image. Note that the adjustment of each pixel is the same as in the first embodiment described earlier, so a detailed description thereof will be omitted.

Other Embodiments

The present invention can be applied to a system constituted by a plurality of devices (e.g., a host computer, interface, reader, and printer) or to an apparatus (e.g., a copying machine or facsimile apparatus) comprising a single device.

Further, the objects of the present invention can also be achieved by supplying a storage medium storing program codes of software for implementing the functions of the above embodiments to a system or an apparatus, and reading out and executing the program codes stored in the storage medium by a computer (or a CPU or MPU) of the system or apparatus.

In this case, the program codes read out from the storage medium implement the functions of the present invention, and the storage medium storing these program codes constitutes the invention.

As this storage medium for supplying the program codes, it is possible to use, e.g., a floppy disk, hard disk, optical disk, magnetooptical disk, CD-ROM, CD-R, magnetic tape, nonvolatile memory card, and ROM.

Furthermore, besides the functions of the above embodiments are implemented by executing the readout program codes by the computer, the present invention includes a case where an OS (Operating System) or the like running on the computer performs part or the whole of actual processing in accordance with designations by the program codes and thereby implements the functions of the above embodiments.

Furthermore, the present invention also includes a case where, after the program codes read out from the storage medium are written in a memory of a function extension board inserted into the computer or of a function extension unit connected to the computer, a CPU or the like of the function extension board or function extension unit performs part or the whole of actual processing in accordance with designations by the program codes and thereby implements the functions of the above embodiments.

In the present invention as has been explained above, desired color adjustment can be performed for an image by suppressing the occurrence of discontinuation in the boundary of a color adjustment region, while restricting this color adjustment region.

Furthermore, since a user can readily predict adjustment results, he or she can easily designate desired color adjustment.

The present invention is not limited to the above embodiments and various changes and modifications can be made within the spirit and scope of the present invention. Therefore, to apprise the public of the scope of the present invention the following claims are made.

What is claimed is:

1. An image processing apparatus for performing color adjustment for image data, comprising:
designating means for designating a reference color, an adjusted color of the reference color, and an adjustment region in a color space, wherein the adjustment region has an interior portion and a boundary, wherein the adjustment region is contained within the color space such that the adjustment region is only a part of the color space, and wherein the adjustment region includes the reference color and the adjusted color;
region determining means for determining whether a pixel value of input image data is in the adjustment region;
adjusted value calculating means for calculating an adjusted pixel value of the image data on the basis of a function of the reference color, the adjusted color and the boundary of the adjustment region, if said region determining means determines that the pixel value of the image data is in the adjustment region,
wherein said adjusted value calculating means derives an intersection of a straight line which connects the reference color and the pixel value of the image data and the boundary of the adjustment region, and calculates the adjusted pixel value of the image data on the basis of the adjusted color of the reference color and the intersection; and
an output section for outputting the adjusted pixel value.

2. The apparatus according to claim 1, wherein the adjustment region is defined as a geometric figure in the color space.

3. The apparatus according to claim 2, wherein the geometric figure is an ellipsoid.

4. The apparatus according to claim 2, wherein the geometric figure is a polyhedron.

5. The apparatus according to claim 1, wherein said adjusted value calculating means calculates the adjusted value of the image data such that the adjustment amount nonlinearly changes with respect to the distance between the image data and the reference color in the color space.

6. The apparatus according to claim 1, wherein the image data is an element of a correction table for color matching.

7. The apparatus according to claim 6, further comprising coordinate transforming means for transforming the image data into the coordinate system of a predetermined color space,
wherein said region determining means and said adjusted value calculating means each perform operations on the image data transformed into the predetermined color space.

8. The apparatus according to claim 7, wherein said designating means designates the reference color, the adjusted color and the adjustment region as values in said predetermined color space.

9. The apparatus according to claim 7, wherein said coordinate transforming means inversely transforms the adjusted value, in the predetermined color space, calculated by said adjusted value calculating means, into the color space coordinate system of the image data.

10. The apparatus according to claim 9, wherein said coordinate transforming means performs affine transformation and inverse transformation thereof.

11. The apparatus according to claim 7, further comprising:
transformation matrix calculating means for calculating, on the basis of the reference color, the adjusted color and the adjustment region, a transformation matrix used by said coordinate transforming means; and
matrix storage means for storing the transformation matrix.

12. The apparatus according to claim 7, wherein
said region determining means further determines that image data is inside a rectangular parallelepiped region containing the adjustment region in the color space, and
if said region determining means determines that the image data is inside the rectangular parallelepiped region, said coordinate transforming means transforms the coordinates of the image data.

13. An image processing method of performing color adjustment for image data, comprising the steps of:
designating, a reference color, an adjusted color of the reference color, and an adjustment region in a color space, wherein the adjustment region has an interior portion and a boundary, wherein the adjustment region is contained within the color space such that the adjustment region is only a part of the color space, and wherein the adjustment region includes the reference color and the adjusted color;
determining whether a pixel value of input image data is in the adjustment region;
calculating an adjusted pixel value of the image data on the basis of a function of the reference color, the adjusted color and the boundary of the adjustment region, if it is determined in the region determination step that the pixel value of the image data is in the adjustment region,
wherein said adjusted value calculating step includes deriving an intersection of a straight line which connects the reference color and the pixel value of the image data and the boundary of the adjustment region, and calculating the adjusted pixel value of the image data on the basis of the adjusted color of the reference color and the intersection; and
an output step, of outputting the adjusted pixel value.

14. An image processing system for performing color matching based on a color correction table in an image processing apparatus in which a monitor and a printer are connected, wherein said image processing apparatus comprises:
designating means for designating, a reference color, an adjusted color of the reference color, and an adjustment region in a color space, wherein the adjustment region has an interior portion and a boundary, wherein the adjustment region is contained within the color space such that the adjustment region is only a part of the color space, and wherein the adjustment region includes the reference color and the adjusted color;
region determining means for determining whether a pixel value of input image data is in the adjustment region;
adjusted value calculating means for calculating an adjusted pixel value of the image data on the basis of a function of the reference color, the adjusted color and the boundary of the adjustment region, if said region determining means determines that the pixel value of the image data is in the adjustment region,
wherein said adjusted value calculating means derives an intersection of a straight line which connects the reference color and the pixel value of the image data and the boundary of the adjustment region, and calculates the adjusted pixel value of the image data on the basis of the adjusted color of the reference color and the intersection; and
an output section for outputting the adjusted pixel value.

15. A computer-readable storage medium, storing a program that performs color adjustment of image data and can be executed on a computer, the program comprising:

a code of a designation step of designating, a reference color, an adjusted color of the reference color, and an adjustment region in a color space, wherein the adjustment region has an interior portion and a boundary, wherein the adjustment region is contained within the color space such that the adjustment region is only a part of the color space, and wherein the adjustment region includes the reference color and the adjusted color;

a code of a region determination step of determining whether a pixel value of input image data is in the adjustment region; and a code of an adjusted value calculation step of calculating an adjusted pixel value of the image data on the basis of a function of the reference color, the adjusted color and the boundary of the adjustment region, if it is determined in the region determination step that the pixel value of the image data is in the adjustment region, wherein the adjusted value calculating step includes deriving an intersection of a straight line which connects the reference color and the pixel value of the image data and the boundary of the adjustment region, and calculating the adjusted pixel value of the image data on the basis of the adjusted color of the reference color and the intersection.

* * * * *

UNITED STATES PATENT AND TRADEMARK OFFICE
CERTIFICATE OF CORRECTION

PATENT NO. : 7,379,204 B2
APPLICATION NO. : 10/052360
DATED : May 27, 2008
INVENTOR(S) : Suzuko Fukao It is certified that error appears in the above-identified patent and that said Letters Patent is hereby corrected as shown below:

COLUMN 5:

Lines 19-25, "
$$M = \begin{vmatrix} 100 & \frac{R_{ref} + R_{ref}}{2}, \\ 010 & \frac{G_{ref} + G_{ref}}{2}, \\ 001 & \frac{B_{ref} + B_{ref}}{2}, \\ 000 & 0 \end{vmatrix} \begin{vmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{vmatrix}$$
"

should read --
$$M = \begin{vmatrix} 100 & \frac{R_{ref} + R_{ref}^1}{2}, \\ 010 & \frac{G_{ref} + G_{ref}^1}{2}, \\ 001 & \frac{B_{ref} + B_{ref}^1}{2}, \\ 000 & 0 \end{vmatrix} \begin{vmatrix} 1 & 0 & 0 & 0 \\ 0 & \cos\theta & -\sin\theta & 0 \\ 0 & \sin\theta & -\cos\theta & 0 \\ 0 & 0 & 0 & 1 \end{vmatrix}$$
--.

COLUMN 8:

Line 43, "ments are" should read --ments being--.

COLUMN 10:

Line 16, "designating," should read --designating--; and
Line 44, "designating," should read --designating--.

UNITED STATES PATENT AND TRADEMARK OFFICE
CERTIFICATE OF CORRECTION

PATENT NO. : 7,379,204 B2
APPLICATION NO. : 10/052360
DATED : May 27, 2008
INVENTOR(S) : Suzuko Fukao It is certified that error appears in the above-identified patent and that said Letters Patent is hereby corrected as shown below:

<u>COLUMN 11</u>:

Line 4, "designating," should read --designating--.

Signed and Sealed this

Sixteenth Day of December, 2008

JON W. DUDAS
*Director of the United States Patent and Trademark Office*